(12) United States Patent
Morey

(10) Patent No.: US 9,125,347 B2
(45) Date of Patent: Sep. 8, 2015

(54) WASTE PROCESSING SYSTEM, MACHINE AND METHOD THEREOF

(76) Inventor: Michael D. Morey, Mt. Pleasant, MI (US)

( * ) Notice: Subject to any disclaimer, the term of this patent is extended or adjusted under 35 U.S.C. 154(b) by 536 days.

(21) Appl. No.: 13/336,908

(22) Filed: Dec. 23, 2011

(65) Prior Publication Data

US 2012/0234949 A1 Sep. 20, 2012

Related U.S. Application Data

(60) Provisional application No. 61/426,652, filed on Dec. 23, 2010.

(51) Int. Cl.
  *B02C 25/00* (2006.01)
  *A01G 3/00* (2006.01)
  *B02C 18/24* (2006.01)

(52) U.S. Cl.
  CPC .............. *A01G 3/002* (2013.01); *B02C 18/24* (2013.01); *B02C 25/00* (2013.01)

(58) Field of Classification Search
  CPC ........ B02C 25/00; B02C 18/24; B02C 23/02; B27L 11/00; A01G 3/002
  USPC .............................. 241/28, 33, 34, 36, 101.71
  See application file for complete search history.

(56) References Cited

U.S. PATENT DOCUMENTS

| | | | |
|---|---|---|---|
| 5,362,004 A | 11/1994 | Bateman | |
| 5,372,316 A | 12/1994 | Bateman | |
| 5,413,286 A | 5/1995 | Bateman | |
| 5,420,463 A * | 5/1995 | Agostino | ........................ 290/54 |
| 5,863,003 A | 1/1999 | Smith | |
| 5,988,539 A | 11/1999 | Morey | |
| 6,000,642 A | 12/1999 | Morey | |
| 6,016,855 A | 1/2000 | Morey | |
| 6,032,707 A | 3/2000 | Morey et al. | |
| 6,036,125 A | 3/2000 | Morey et al. | |
| 6,047,912 A | 4/2000 | Smith | |
| 6,059,210 A | 5/2000 | Smith | |
| 6,076,572 A | 6/2000 | Cook | |
| 6,299,082 B1 | 10/2001 | Smith | |
| 6,357,684 B1 | 3/2002 | Morey | |
| 6,517,020 B1 | 2/2003 | Smith | |
| 6,591,973 B2 | 7/2003 | Smith | |
| 6,722,596 B1 | 4/2004 | Morey | |

(Continued)

FOREIGN PATENT DOCUMENTS

| | | |
|---|---|---|
| AU | 4574502 | 12/2002 |
| AU | 763881 | 7/2003 |

(Continued)

OTHER PUBLICATIONS

U.S. Appl. No. 11/796,074, Apr. 26, 2007, Holmes.

(Continued)

*Primary Examiner* — Mark Rosenbaum
(74) *Attorney, Agent, or Firm* — Paparella & Associates, PC; Joseph A. Paparella

(57) ABSTRACT a waste processing machine for reducing wood waste comprises an accumulator operatively connected to the cutting system so as to power the cutting system upon discharge thereof. The accumulator is adapted to receive, store, and release a charge developed from a charging device operatively connected to the accumulator and one or more systems of the waste processing machine.

1 Claim, 12 Drawing Sheets

(56) References Cited

U.S. PATENT DOCUMENTS

| | | |
|---|---|---|
| 6,729,567 B1 | 5/2004 | Morey |
| 6,804,871 B1 | 10/2004 | Smith |
| 6,814,320 B1 | 11/2004 | Morey et al. |
| 6,830,204 B1 | 12/2004 | Morey |
| 6,845,931 B1 | 1/2005 | Smith |
| 6,955,310 B1 | 10/2005 | Morey |
| 7,007,874 B1 | 3/2006 | Smith |
| 7,011,124 B1 | 3/2006 | Morey |
| 7,121,485 B2 | 10/2006 | Smith |
| 7,121,488 B1 | 10/2006 | Marriott et al. |
| 7,163,166 B1 | 1/2007 | Smith |
| 7,384,011 B1 | 6/2008 | Smith |
| 7,726,594 B2 | 6/2010 | Smith |
| 2011/0062266 A1 | 3/2011 | Smith |

FOREIGN PATENT DOCUMENTS

| | | |
|---|---|---|
| AU | 2009345114 | 11/2010 |
| CA | 2103633 | 3/1994 |
| CA | 2133119 | 4/1995 |
| CA | 2133120 | 4/1995 |
| CA | 2132942 | 3/1996 |
| CA | 2354105 | 3/2002 |
| CA | 2381889 | 12/2002 |
| CA | 2742211 | 11/2010 |
| CA | 2266176 | 12/2010 |
| EP | 1186345 | 3/2002 |
| EP | 1266692 | 12/2002 |
| EP | 1952888 | 8/2008 |
| EP | 09844192.6 | 7/2009 |
| ES | 2014136 | 6/1989 |
| FR | 2631778 | 12/1989 |
| IT | 1229382 | 8/1991 |
| JP | 2002177806 | 6/2002 |
| JP | 2003103193 | 4/2003 |
| WO | WO2010/126541 | 11/2010 |

OTHER PUBLICATIONS

U.S. Appl. No. 10/721,622, Nov. 25, 2003, Casper.
U.S. Appl. No. 10/992,158, Nov. 18, 2004, Morey.
U.S. Appl. No. 07/942,741, Sep. 9, 1992, Bateman.
U.S. Appl. No. 07/874,751, Apr. 27, 1992, Bateman.
U.S. Appl. No. 13/318,142, Oct. 29, 2011, Morey.
U.S. Appl. No. 13/342,466, Jan. 3, 2012, Holmes.

* cited by examiner

WASTE PROCESSING SYSTEM, MACHINE AND METHOD THEREOF

CROSS REFERENCE TO RELATED APPLICATIONS

This application claims the benefit of the filing date of U.S. provisional application Ser. No. 61/426,652 entitled "Hybrid Waste Processing System, Machine and Method thereof" which was filed on Dec. 23, 2010 and which is incorporated herein by reference in its entirety.

BACKGROUND OF THE INVENTION

The present invention relates to waste processing machines, and more specifically to waste processing machines for processing wood such as brush, branches, and the like.

A variety of machines have been developed to recycle, reduce, or otherwise process wood and brush products. Included therein are machines that chip, cut, grind, or otherwise reduce waste (wood) products including, generally, chippers (disk and drum types), hammer mills, hogs, shredders, grinders, and forestry mowers.

These waste processing machines and systems typically include an infeed system and a waste reducing system, wherein the infeed system is used for directing the waste material to the waste reducing system, the waste reducing system being used for reducing the waste material. Examples of such a waste processing machines are disclosed in U.S. Pat. No. 6,845,931, issued Jan. 25, 2005, to Smith, entitled "Multi-Functional Tool Assembly For Processing Tool of Waste Processing Machine" which is incorporated herein by reference in its entirety.

It is also known to provide a wood chipper for chipping wood such as brush, branches, and the like to produce wood chips. An example of such a wood chipper is disclosed in U.S. Pat. No. 5,988,539 to Morey which is incorporated herein by reference in its entirety. In these known systems, the wood chipper generally includes an infeed assembly, feed wheel assembly, and a cutting assembly having a rotatable disc or drum with at least one knife or blade for chipping the wood entering the wood chipper and reducing it to wood chips. The chipper also includes a discharge chute for allowing the wood chips to exit the wood chipper, as well as for generally directing them during discharge. Typically, the feed wheel assembly includes: a stationary lower feed wheel, connected to a lower housing; a movable upper feed wheel, connected to an upper housing, and movable relative to the lower housing for allowing wood to enter the cutting assembly. The wood chipper also includes an engine connected to a hydraulic pump, which pumps fluid to drive hydraulic motors to rotate the feed wheels.

Other examples of such wood chippers are disclosed in U.S. Pat. No. 6,032,707 to Morey et al; U.S. Pat. No. 6,036,125 to Morey et al; U.S. Pat. No. 6,016,855 to Morey; U.S. Pat. No. 5,988,539 to Morey; U.S. Pat. No. 6,000,642 to Morey; U.S. Pat. No. 6,722,596 to Morey; U.S. Pat. No. 6,357,684 to Morey; U.S. Pat. No. 6,830,204 to Morey; U.S. Pat. No. 7,121,488 to Marriott et al; U.S. Pat. No. 6,814,320 to Morey et al.; and U.S. Pat. No. 6,955,310 to Morey, all of which are incorporated herein by reference in their entirety.

In these prior art systems, while the internal combustion engine offers many known advantages, these prior art engines also suffer from several problems. As most existing systems are powered by either gasoline or diesel engines, and as the costs and known problems associated with petroleum powered products increase, so to do the problems associated with the operation of these waste machines. For example, the disadvantages of these known systems include, inter alia, emissions, noise; reliance on volatile fuel products, and consumption.

Additionally, it is not practical to power these machines only when the reducing operation is needed or takes place as these waste machines require additional energy and time in which to place the machine into the running or at-speed mode (e.g., to place the machine in or obtain the desired operational characteristics). As such, it is not practical to shut these machines down during the interim periods of time when the reduction systems are not being utilized to reduce bulk wood products, but the overall reduction process is still required. For example, between reduction runs and when gathering material to be reduced. At these times, in most applications, these machines remain powered and are thereby consuming resources even though the actual reduction operation is not occurring. Hence, these machines remain on or powered, thereby using energy, during periods of time when the machine is not being used to actually reduce waste products. Further, during this ramp up period a substantial portion of the energy used goes into powering up or ramping up the various operating systems of the machine (e.g., the cutting head) and the power required to initiate and fully power up these various systems can be substantially more (higher) than the power required to maintain them at the desired operational level(s). That is to say that the initial or start up energy or power consumption (e.g., load) of the machine is generally higher than the energy or power consumption (e.g., load) of the machine when running at the desired rate (i.e., running at speed).

Further, these machines consume more energy when the demand on the machine is high, than they do at other times of operation (e.g., when not under load or processing). For example, when the demand on the cutting head is high, as when reducing heavy loads, the power consumption of the machine may increase or spike. As such, the power sources (e.g., engines, drives, etc.) for these machines must be able to output a higher load in order to ensure that the system is capable of operating during these high demand cycles. Hence, a larger power source is required even though the machine, generally, only requires this higher capability during higher demand cycles. Therefore, a higher powered drive (e.g., a higher Horse Power (HP) motor or drive) is required even though during the majority of operational time a lower powered drive would be acceptable. As larger power sources typically requires more energy to operate, the result is that by sizing the power source to meet peak demand (as opposed to a lower requirement: for example, typical demand), more energy is used to power the larger power source at all times. To wit, more energy is required by the larger engine even when no demand is placed on the machine. Therefore, more energy is used at all times of operation, even though the demand for the higher output is only required intermittently. Yet further, these higher powered engines are typically also noisier, costlier to fix and maintain, and more difficult to repair than their smaller counterparts. Therefore, there is a need in the art to provide novel systems and methods for these waste machines that overcome the existing disadvantages.

Accordingly, a need exists for novel systems and methods which have, among other advantages, the ability to allow for the use of reduced sized power sources; the ability to utilize, harness, capture, and recycle energy during periods of reduced or low load, as well as the ability to provide additional power during periods of higher demand loads. Therefore, a waste processing machine and methods thereof that solve the aforementioned disadvantages and having the aforementioned advantages is desired.

SUMMARY OF THE PRESENT INVENTION

The aforementioned drawbacks and disadvantages of these former waste processing machines have been identified and a solution is set forth herein by the inventive waste processing machine which includes a waste processing machine for reducing wood material which comprises a power system and a cutting system. Also disclosed is a an accumulator which is adapted to receive, store, and release energy (e.g., a charge, form of energy, power), wherein the accumulator is operatively connected to at least one of the power system and the cutting system and is adapted to provide the energy or charge to at least one of the power system and the cutting system, for example, upon discharge thereof. Also disclosed is a charging device for producing the energy or charge and which charges the accumulator with the energy or charge, wherein the charging device is operatively connected to the accumulator and operatively connected to at least one of the power system and the cutting system. Further, the charging device is adapted to produce the charge in response to the at least one of the power system and the cutting system, for example, when operated, whereby the accumulator is adapted to provide the energy or charge stored therein to the at least one of the power system and the cutting system.

Further exemplary embodiments and variations are disclosed wherein: the accumulator may be adapted to receive, store, and release an electrical charge; the accumulator may comprise a battery; the accumulator may be adapted to receive, store, and release a hydraulic charge; the accumulator may be adapted to receive, store, and release a pressurized charge and further, the accumulator may be adapted to receive, store, and release the pressurized charge through cooperation between a hydraulic fluid and a compressive gas; and the accumulator may comprise at least one tank for receiving, storing, and releasing a pressurized charge and further, the tank may comprise a compressive gas for receiving, storing, and releasing the pressurized charge, and may be adapted to store the pressurized charge in a compressive gas, and may include at least a first and a second chamber separated by a movable divider, bladder, piston or other separation, wherein one of the first and the second chamber is adapted to receive a hydraulic fluid and the other of the second and first chamber is adapted to retain a pressurized gas; the accumulator may be hydraulically connected to the at least one of the power system and the cutting system; the accumulator may hydraulically provide the charge to the at least one of the power system and the cutting system; the accumulator may hydraulically provides the charge to a hydraulic motor operably connected to the at least one of the power system and the cutting system, and the waste processing machine may further comprise a feed system, wherein the accumulator hydraulically provides the charge to a motor operably connected to the at least one of the power system, the cutting system, and the feed system; the accumulator may be used exclusively to initiate rotation of the cutting system; the accumulator may be activated before an auto reverse function; the charging device may be hydraulically connected to the accumulator; the charging device may be hydraulically connected to the at least one of the power system and the cutting system; the waste processing machine may further comprise a frame including a pair of wheels, and the charging device may be operably connected to the pair of wheels for producing the charge thereby; the charging device may include a hydraulic pump to produce a hydraulic charge; the accumulator may hydraulically provide the charge to the at least one of the power system and the cutting system; the charging device may be adapted to produce the charge in response to a rotational input by the at least one of the power system and the cutting system and further, the rotational input may comprise a shaft, wherein the charging device produces the charge in response to rotation of the shaft; the accumulator and the charging device may be hydraulically connected to the cutting system; a control system may be adapted to control operation of at least one of the charging device and the accumulator and further, the control system may be adapted to charge the accumulator in response to the cutting system being in a no load condition, and the control system may be adapted to discharge the accumulator in response to the power system being at or above a first preset limit; a control system may be adapted to control operation of the charging device and the state of the accumulator; a control system may be adapted to control operation of at least one of the charging device and the accumulator in response to a load; and a control system may be adapted to control operation of the accumulator in response to a pressure in the accumulator.

Another aspect of the present invention a waste processing machine for reducing wood material comprises a frame including at least one pair of wheels, a primary power source operatively supported by the frame, an infeed assembly for receiving waste material to be reduced, and a rotatable cutting assembly operatively supported by the frame and spaced from the infeed assembly, whereby the cutting assembly comprises a cutting head which is axially mounted on a shaft, the shaft being operatively connected to the primary power source for rotation thereof. Also disclosed is a feed system disposed between the infeed assembly and the cutting assembly which feeds material to the cutting assembly, an accumulator operatively connected to the shaft, whereby the accumulator is adapted to at least partially rotate the shaft, and a charging device which is operatively connected to the accumulator and adapted to charge the accumulator, whereby the charging device charges the accumulator and the accumulator at least partially drives the cutting system.

Further exemplary embodiments and variations are disclosed wherein: the accumulator may be adapted to receive, store, and release a pressurized charge through cooperation between a hydraulic fluid and a compressive gas; the accumulator may comprise at least one tank for receiving, storing, and releasing a pressurized charge, and the tank may include at least a first and a second chamber separated by a movable divider, wherein one of the first and the second chamber is adapted to receive a hydraulic fluid and the other of the second and first chamber is adapted to retain a pressurized gas; the accumulator may be hydraulically connected to the cutting system; the accumulator may hydraulically provide the charge to a hydraulic motor operably connected to the cutting system; the charging device may be hydraulically connected to the accumulator; the charging device may be hydraulically connected to the at least one of the power system and the cutting system; the waste processing machine may further comprise a frame including a pair of wheels, and the charging device operably connected to the pair of wheels for producing the charge thereby; the charging device may include a hydraulic pump to produce a hydraulic charge; the accumulator may hydraulically provide the charge to the cutting system; the charging device may be adapted to produce the charge in response to input by the at least one of the power system and the cutting system; the accumulator and the charging device may be hydraulically connected to the cutting system; a control system may be adapted to control operation of at least one of the charging device and the accumulator and further, the control system may be adapted to charge the accumulator in response to the cutting system not being actively used and the control system may be adapted to discharge the accumulator in response to the power system being at or above a first preset limit; a control system may be adapted to control operation of the charging device and the state of the accumulator; a control system may be adapted to control operation of at least one of the charging device and the accumulator in response to a load on one or more of a primary systems of the waste processing machine; and a control system may be adapted to control operation of the accumulator in response to a pressure in the accumulator.

Another aspect of the present invention includes a hybrid wood chipper for reducing wood material which comprises a frame comprising and at least one pair of wheels, a primary power source operatively supported by the frame, an infeed assembly for receiving waste material to be reduced, and a rotatable cutting assembly which is operatively supported by the frame and spaced from the infeed assembly, whereby the cutting assembly comprises a cutting head rotatably mounted on a shaft, and the shaft may be operatively connected to the primary power source for rotation thereof. Also provided is a secondary power source which is hydraulically connected to the shaft via a hydraulic motor, whereby the secondary power source is adapted to at least partially rotate the shaft and to receive, store, and release a hydraulic charge. Further, a charging device may be hydraulically connected to the secondary power source which may be adapted to charge the secondary power source, whereby the charging device may be operatively connected to one or more rotational systems of the wood chipper and operated thereby. In this manner, the charging device hydraulically charges the secondary power source, and the secondary power source at least partially drives the cutting head via the discharge of the accumulated charge.

Yet another embodiment is disclosed which provides a secondary power source for a rotatable cutting head of a waste processing system, wherein the rotatable cutting head mounted is axially on a shaft and the shaft is operatively connected to a primary power source for rotating the cutting head. The secondary power source comprises an accumulator which adapted to be operatively connected to the shaft and the accumulator is adapted to rotate the shaft thereby at least partially powering the cutting system, and the accumulator is adapted to receive, store, and release a charge. Also provided is a charging device which is adapted to be operatively connected to the accumulator for charging the accumulator, whereby the charging device may be adapted to be operatively connected to one or more of the primary systems of the waste processing system and adapted to produce a charge in response to the one or more primary systems when operated. As such, the charging device is adapted to charge the accumulator, and the accumulator is adapted to power the cutting head, via the shaft, through the discharge of an accumulated charge.

Still another embodiment comprises a waste processing machine for reducing wood material which comprises a frame comprising at least one pair of wheels, a primary power source operatively supported by the frame and operatively connected to at least one of a cutting system and a feed system, an infeed assembly for receiving waste material to be reduced, and a rotatable cutting assembly operatively supported by the frame and spaced from the infeed assembly, whereby the cutting assembly comprises a cutting head axially mounted on a shaft, the shaft being operatively connected to the primary power source for rotation thereof. Also disclosed is a feed system disposed between the infeed assembly and the cutting assembly which is adapted to feed material to the cutting assembly, and a secondary power source which may be operatively connected to the shaft, whereby the secondary power source may be adapted to at least partially rotate the shaft (e.g., via a motor). Further, the secondary power source may comprise at least one tank for receiving, storing, and releasing a pressurized charge, and the tank may comprise a first and a second chamber separated by a movable member, wherein one of the first and the second chamber is adapted to receive a hydraulic fluid and the other of the second and first chamber is adapted to retain a pressurized gas. Additionally, a pump may be hydraulically connected to the secondary power source and adapted to pump hydraulic fluid to the secondary power source, whereby the pump is operatively connected to the waste processing machine for operation thereby. Yet further, a control system may be adapted to control operation of the pump and the pressurized charge of the secondary power source, whereby the pump charges the secondary power source and the secondary power source at least partially drives the cutting system through the shaft, via the pressurized charge, and as controlled by the control system.

In another aspect of the present invention, a power source for a cutting assembly of a waste processing machine comprises an accumulator which is adapted to receive, store, and release a charge, the accumulator being operatively connected to the cutting assembly and adapted to drive the cutting assembly upon release of the charge in the accumulator. A charging device for charging the accumulator and producing the charge therein is operatively connected to the accumulator and the charging device is also operatively connected to the cutting assembly and adapted to produce the charge in response to rotation of the cutting assembly. As such, the accumulator is adapted to provide the charge stored therein to the cutting assembly.

In another aspect of the present invention, a method of powering a waste processing machine is disclosed which comprises: Providing a waste processing machine comprising a trailorable frame comprising wheels, a power source, a cutting system, and a feed wheel system; providing a motor operatively connected to a cutting system of a waste processing machine; providing a charging device operably connected to the accumulator, the charging device adapted to produce a charge via the operable connection; providing an accumulator operatively connected between the motor and the charging device, the accumulator adapted to receive and store the charge produced by the charging device, and further adapted to release the charge to the motor; producing the charge with the charging device; receiving the charge in the accumulator; storing the charge in the accumulator; releasing the charge to the motor; and thereby driving the cutting system via the motor utilizing the charge.

Other objects, advantages, and features of the invention will become apparent upon consideration of the following detailed description and drawings. As such, the above brief descriptions set forth, rather broadly, the more important features of the present novel invention so that the detailed descriptions that follow may be better understood and so that the contributions to the art may be better appreciated. There are of course additional features that will be described hereinafter which will form the subject matter of the claims.

In this respect, before explaining the preferred embodiment of the disclosure in detail, it is to be understood that the disclosure is not limited in its application to the details of the construction and the arrangement set forth in the following description or illustrated in the drawings. To wit, the waste processing machine of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the claims, unless so claimed.

As such, those skilled in the art will appreciate that the conception upon which this disclosure is based may readily be used as a basis for designing other structures, methods, and systems for carrying out the several purposes of the present invention. It is important therefore that the claims are regarded as including such equivalent constructions, as far as they do not depart from the spirit and scope of the present invention.

Further, the purpose of the Abstract is to enable the United States Patent and Trademark Office, the public generally, and especially the scientists, engineers, and practitioners in the art who are not familiar with the patent or legal terms of phraseology, to learn quickly, from a cursory inspection, the nature of the technical disclosure of the application. Accordingly, the Abstract is intended to define neither the invention nor the application, which is only measured by the claims, nor is it intended to be limiting as to the scope of the invention in any manner.

These and other objects, along with the various features and structures that characterize the invention, are pointed out with particularity in the claims annexed to and forming a part of this disclosure. For a better understanding of the waste processing machine of the present disclosure, its advantages, and the specific traits attained by its use, reference should be made to the accompanying drawings and other descriptive matter in which there are illustrated and described the preferred embodiments of the invention.

As such, while embodiments of the waste processing machine are herein illustrated and described, it is to be appreciated that various changes, rearrangements, and modifications may be made therein without departing from the scope of the invention as defined by the claims.

BRIEF DESCRIPTION OF THE DRAWINGS

As a compliment to the description and for better understanding of the specification presented herein, 13 pages of drawings are disclosed with an informative, but not limiting, intention.

FIG. 8A is a diagrammatic representations of one system configuration of a control system according to one embodiment of the present invention;

DETAILED DESCRIPTION OF THE PREFERRED EMBODIMENT

The best mode for carrying out the invention is presented in terms of the preferred embodiment, wherein similar referenced characters designate corresponding features throughout the several figures of the drawings.

Figure 1:
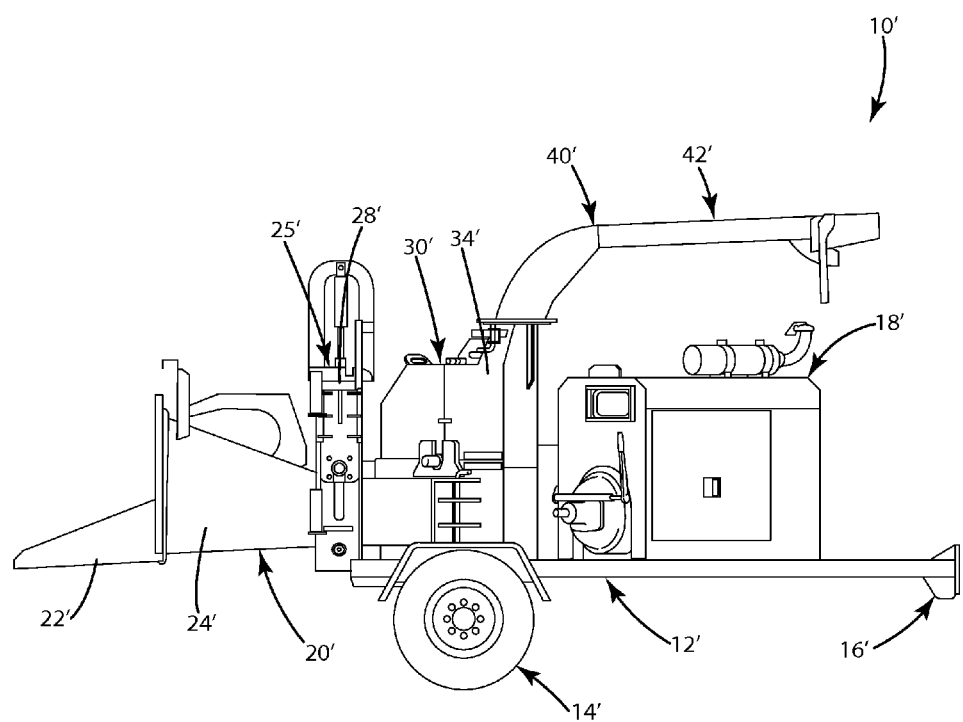
FIG. 1 is a side view of a prior art wood chipper.

For purposes of description herein, the terms "upper", "lower", "right", "left", "rear", "front", "vertical", "horizontal", and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the invention, examples of which are illustrated in the accompanying drawings. Wherever possible, these same referenced numerals will be used throughout the drawings to refer to the same or like parts. Like features between the various embodiments utilize similar numerical designations. Where appropriate, the various similar features have been further differentiated by an alphanumeric designation, wherein the corresponding alphabetic designator has been changed. Further, the dimensions illustrated in the drawings (if provided) are included for purposes of example only and are not intended to limit the scope of the present invention. Additionally, particular details in the drawings which are illustrated in hidden or dashed lines are to be considered as forming no part of the present invention.

As used herein, the term wood and wood products are meant to be used and defined in their broad, general, and ordinary sense, and the terminology is meant to include trees, brush, trunks, stems, branches, leaves, or the like, or anything else that could otherwise be recycled, reduced, or otherwise processed, and further includes non-naturally occurring or manufactured wood products such as lumbar, pallets, or other manufactured products that could otherwise be recycled, reduced, or otherwise processed, as is generally known within the art.

As used herein, the term waste processing machine is meant to be used and defined in its general and ordinary sense. To wit, systems that recycle, reduce, or otherwise process wood products. Included therein are machines that chip, cut, grind, or otherwise reduce wood waste products and include, generally, chippers and/or shredders. Of course, this is not meant to be limiting in any manner and these systems may take on numerous configurations, and may be used for numerous purposes as is generally known within the art.

Generally speaking, it is not practical to power these waste processing machines only when the reducing operation is taking place. For example, these machines typically require a period of time in which to obtain the desired operational characteristics. During this ramp up period, a substantial portion of the power required goes into powering up or ramping up the various operating systems of the machine (e.g., the cutting head). Further, during this initial ramp up period the power required to initiate and fully power up these various systems can be substantially more than the power required maintaining them at the desired operational levels. As such, it is usually not practical to shut down these machines during the interim periods of time when the reduction systems are not being utilized but the reduction process is still required. This can occur, for example, between reduction runs and when gathering material to be reduced. At these times, in most applications, these machines remain powered and are thereby consuming resources even though the reduction operation is not occurring.

Further, as mentioned above, these machines initially consume a higher load during the ramp up period and when reducing heavy loads, than they do at other times of operation. As such, the power sources for these machines must be able to output a higher load in order to ensure that the system is capable of operating during these high demand cycles. Hence, a larger power source is required even though the machine, generally, only requires the higher capability during high demand cycles. As such, a higher powered drive is required even though during the majority of time in operation a lower powered drive would be acceptable. Hence, more energy is used to power the higher demand engine, at all times, even though the demand for the higher output is only required intermittently. In addition to these higher powered engines consuming more fuel at all stages of their operation, they are also generally noisier, costlier to fix and maintain, and more difficult to repair than their smaller counterparts. Therefore, there is a need in the art to provide novel systems and methods for these waste machines that overcome the existing disadvantages.

Accordingly, a need exists for novel systems and methods which have, among other advantages, the ability to utilize, harness, capture, and recycle energy during periods of reduced load, as well as the ability to provide additional power during periods of higher demand loads. Further, a need exists for waste processing systems and methods that are, among other things: easily operable; less expensive to repair, operate, and maintain; result in increased productivity; reduce fuel consumption and noise; as well as are cost effective. Therefore, a waste processing machine and methods thereof that solve the aforementioned disadvantages and having the aforementioned advantages is desired.

While not meant to be limiting in any manner, it is envisioned that the disclosed system may offer the following advantages: The waste processing system may be designed to utilize a smaller (e.g., primary) power source than is required without the inventive (e.g., secondary) rechargeable power source. For example, in one embodiment, the invention may be configured to utilize an Internal Combustion (IC) engine that is rated below 50 Horse Power (HP), whereas existing systems operating at the same level require an IC engine rated above 50 HP. Alternatively, the invention may be configured to utilize an electrical drive that is rated below 150 peak amps, whereas existing systems require a drive rated above 150 amps; smaller power sources are typically less noisy and as such are less burdensome; smaller power sources are generally less expensive to repair, operate, and maintain resulting in increased productivity and reduced expenses and overhead; smaller power sources generally require less energy to operate, again resulting in reduced expenses and overhead; smaller power sources are generally responsible for reduced pollutants being released into the environment, whether through the fuel combusted therein (e.g., in an IC engine), or in the production and distribution of the energy used therewith (e.g., in an electrical drive); the utilization of smaller power sources allows for the extended operation of the processing machine.

Further, by utilizing a rechargeable secondary power source, the rechargeable power source may be used to assist the primary power source, for example during periods of high demand, such that a smaller primary power source can be utilized; by utilizing a rechargeable (secondary) power source, the waste processing machine (e.g., primary power source) may be used to recharge the secondary power source, for example during periods of no or low demand, thereby recovering energy that would have been otherwise wasted. by utilizing a secondary power source, the waste processing machine can be adapted to recharge the secondary power source during transportation, use, and storage; by utilizing secondary, rechargeable power sources, peak demand applications can be accommodated without increasing the size of the primary power source; by utilizing secondary, rechargeable power sources, operation of the waste processing machine can be accommodated without powering the primary power source; and by utilizing a control system to control the charge and release of the rechargeable power source, the charge and discharge thereof may be accomplished without operator input and according to the demand required and determined; in one embodiment the inventive system utilizes relatively simple mechanical and electrical devices in its operation and therefore, may be more reliable than complex devices. For example, the control system may be actuated via an operator controlled switch which is operatively connected to a mechanical valve disposed within the hydraulics of the system. While in another embodiment, the control system is configured so as to require the load or engine speed of the system to be at or above a predefined level or condition to activate the rechargeable source.

In general, these prior art chippers 10' include a rotatable shaft (not shown) operably connected to the disc/drum of the cutting assembly 30' and a pulley (not shown) disposed about one end of the shaft. The chipper also includes a rotatable shaft (not shown) operatively connected to the engine and a pulley (not shown) disposed about the shaft (not shown). The chipper further includes a belt or belts (not shown) disposed over and interconnecting the pulleys. It should be appreciated that the engine rotates the cutting assembly 30' and, typically, a hydraulic pump (not shown) pumps hydraulic fluid to rotate the feed wheels of the feed wheel assembly.

Referring now to the drawings and to FIG. 1 in particular, a prior art wood chipper is shown generally at 10' and includes a frame 12' supported by a pair of wheels 14', a conventional trailer hitch 16' to allow the chipper to be towed by a vehicle (not shown), and a power source 18'. Supported on frame 12', the wood chipper 10' includes: an infeed assembly or system 20' comprising an infeed tray 22' and an infeed chute 24' to allow wood material to enter the wood chipper; a feed system 25' comprising a feed wheel assembly (not shown), the feed wheel assembly typically comprising at least one feed wheel (not shown) disposed between the infeed system 20' and the cutting system 30' to feed wood material to the cutting system, and one or more feed wheel housings 28'; a cutting assembly or system 30' spaced from the feed system 25' and comprising cutters (not shown) and a cutting assembly housing 34'; and a discharge assembly 40' comprising a discharge chute 42'.

The power source 18' typically comprises an internal combustion engine and provides rotational energy to both the feed wheels (not shown) of the feed system 25' and the cutting disc/drum (not shown) of the cutting system 30'. The engine 18' operatively couples the feed system 25' and cutting system 30' to cause rotation of the feed wheels (not shown) and the rotatable disc/drum (not shown). The engine 18' is typically operated such that the cutting disc/drum (not shown) rotates at a relatively high velocity, while the feed wheels (not shown) rotate relatively slowly. In operation, trees, brush, and other bulk wood products are fed into the infeed chute 24' and captured between, for example, opposed, rotating feed wheels (not shown) of the feed system 25' which feed, pull, or otherwise cause the bulk wood products to encounter the cutting disc/drum (not shown) of the cutting system 30'. The cutting system then reduces the bulk wood products into chips which are expelled through discharge chute 42'.

Figure 2:
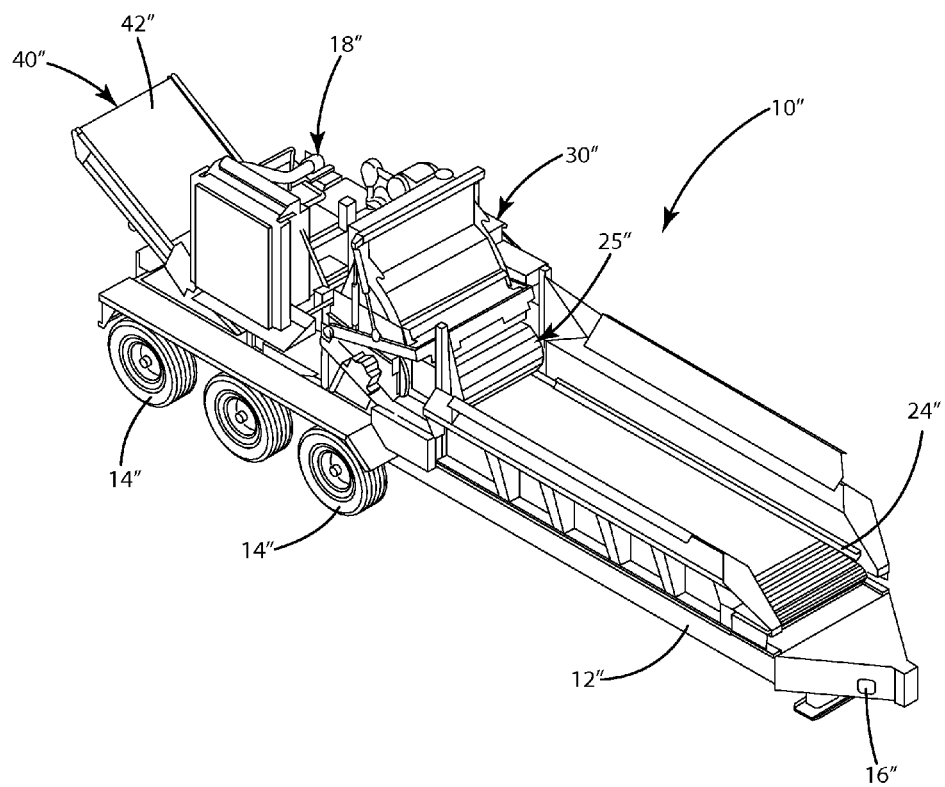
FIG. 2 is a perspective view of a prior art waste conveyor style processing machine.

Referring now to FIG. 2, a prior art waste processing machine for reducing material is shown generally at 10". The waste processing system includes a frame 12" supported by a plurality of wheels 14"; a tongue, mount, or trailer hitch 16" to allow the system to be towed by a vehicle (not shown); and a power source 18". The material processing machine 10" also includes an infeed assembly 20" including an infeed conveyor 24"; a feed system 25" including a feed wheel 26" typically comprising at least one feed wheel 26" disposed between the infeed system 20" and the cutting system 30" to feed wood material to the cutting system; a cutting assembly or system 30" spaced from the feed system 25" and comprising cutters (not shown); and a discharge assembly 40" comprising a discharge conveyor 42". It should be appreciated that, with this structure, the infeed system 20" and material reducing system 30" can be transported together while the discharge system 40" can be transported separately therefrom. It should also be appreciated that the material processed may take many forms and varieties such as wood, wood products, waste, boards, roots, brush, etc., and processed into different forms such as wood chips, sawdust, waste material, etc.

In operation, material enters the material processing machine 10" through the infeed system 20" where it is directed to the material reducing system 30". The material reducing system 30" reduces the material and directs it to the discharge system 40" where the reduced material is expelled from the material processing machine 10".

It should be appreciated that the primary components of the wood chipper and the waste processing machine, generally, comprise similar components and operation. To wit, both systems comprise an infeed system, a feed system (if so equipped), a cutting or reducing system, and a discharge system and, while the particular configurations of each of these systems are adapted for its particular use as either a wood chipper or a waste processing machine, both systems are utilized to process (e.g., reduce) material (e.g., bulk wood products). As such: as used herein the terms wood chipper, waste processing machine and system, waste reduction machine and system, or other like terminology may used interchangeably; therefore, when one term is used for brevity, it is to be understood that this is not meant to be restrictive in nature and the definition ascribed thereto should encompass all of the former; and further, when the term waste processing machine or system is used, it is to be understood that this definition is to encompass a wood chipper; and when the term wood chipper is used, it is to be understood that this definition is to encompass a waste processing machine; as such, various terminology may be used herein for brevity, with the stipulation that the invention disclosed herein may be used on, is capable of, and may be adapted for use within or with-on any waste processing machine, including but not limited to a wood chipper, unless defined otherwise.

Further, while one preferred embodiment incorporates a pair of opposed, horizontally aligned feed wheels, it is understood that any feed system may be utilized.

It should be further understood that this disclosure describes the structure and operation of an accumulator 50 with respect to a hydraulic system, however, other systems may also be utilized including, for example mechanical, electrical, or any other form of potential energy.

Still further, the waste processing system 10 is described and illustrated as being operated by a power source comprising either an Internal Combustion (IC) engine, or an electrical drive or engine. However, the waste system and methods described herein may be powered by any suitable system including, but not limited to, electricity, gas, diesel, or power take-off from an auxiliary power source, without departing from the scope of this invention.

Figure 3:
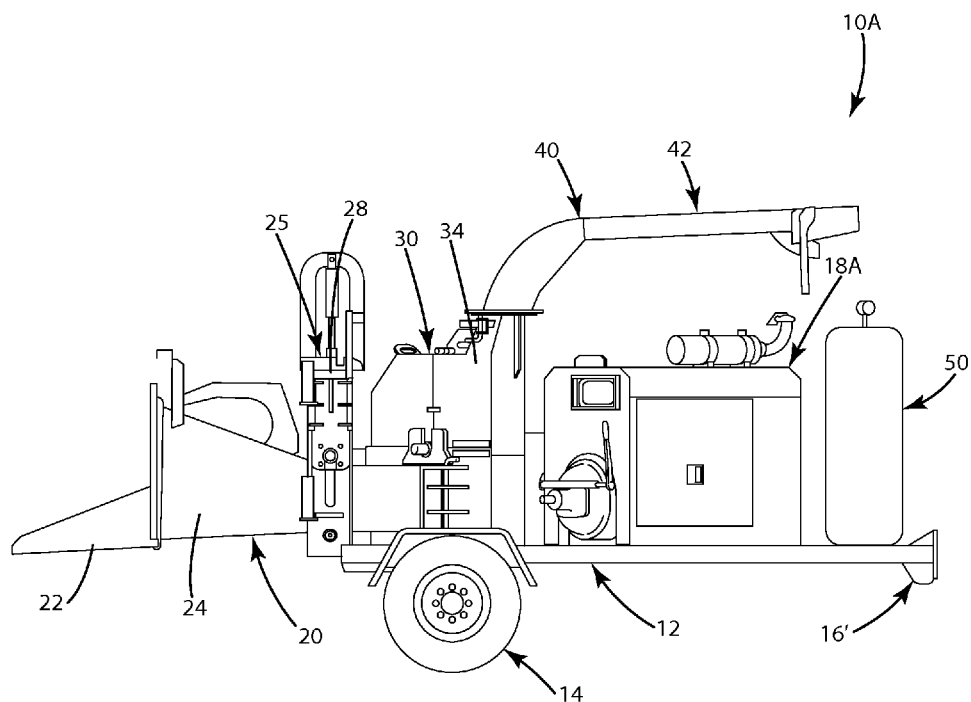
FIG. 3 is a side view of an embodiment of the waste processing machine of the present invention comprising a wood chipper.
Figures 3A, 3B:
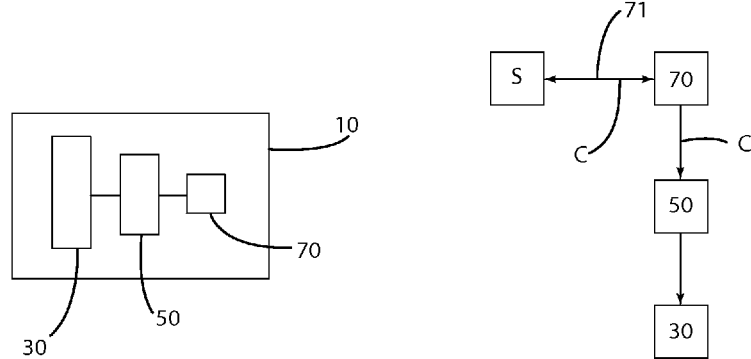
FIGS. 3A-3B are diagrammatic representations of one system configuration of an accumulator according to one embodiment of the present invention.
Figure 4:
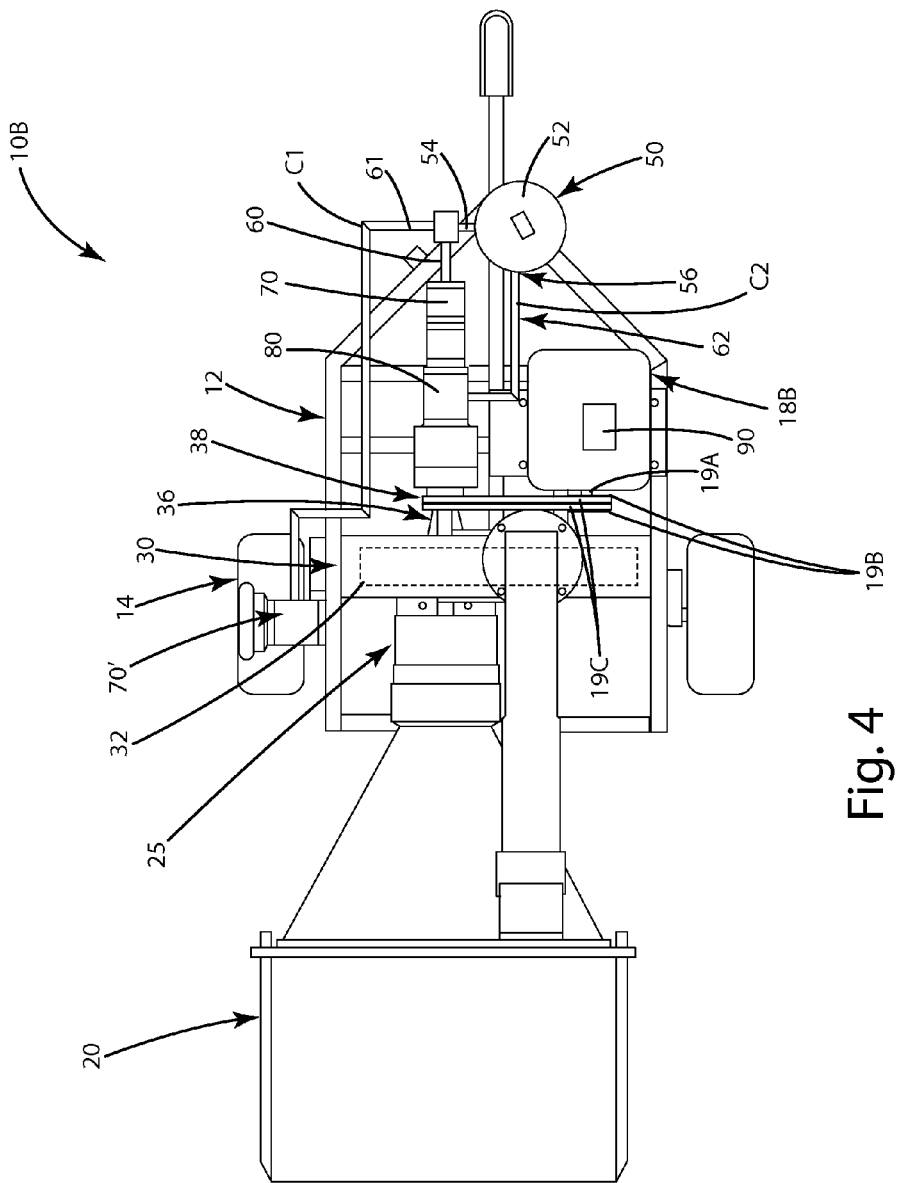
FIG. 4 is a top view of another embodiment of a waste processing machine of the present invention.

The disadvantages and drawbacks of the prior art are overcome through the waste processing system of the present invention, wherein preferred embodiments are disclosed in FIGS. 3-10B. Referring now to FIGS. 3A, 3B, 3 and 4, embodiments of a wood chipper are shown generally at 10 and include a frame 12 supported by a pair of wheels 14, and a trailer hitch 16 in order to allow the waste processing system to be transported by a vehicle. Supported on the frame 12 are an infeed system 20, a feed system 25 spaced therefrom, a cutting system 30 spaced therefrom, and a discharge system 40. A power system 18, typically comprising an internal combustion engine (18A as depicted in FIG. 3) or an electrical drive or motor (18B as depicted in FIG. 4), is also mounted on frame 12 to provide power to both the feed system 25 and the cutting system 30. As illustrated by FIGS. 3A and 3B, an accumulator 50 is operatively connected to the cutting system 30 so as to power the cutting system 30, for example upon discharge of the accumulator 50, wherein the accumulator 50 may be adapted to receive, store, and release a charge, for example via a charging device 70. Charging device 70, which is adapted to produce a charge (C), is operatively connected to the accumulator 50 and is adapted to charge the accumulator, wherein the charging device 70 is operatively connected to one or more systems (S) of the wood chipper 10 which are adapted to operate the charging device 70 and thereby produce a charge (C) in response to the operable connection 71. In this manner the charging device 70 produces a charge via its operable connection 71 to the one or more systems (S) of the chipper, this charge (C) is sent to, received by, and may be stored by/in the accumulator 50, whereby the accumulator may then power the cutting system 30, for example through the discharge of the accumulated charge.

For example, as depicted in FIG. 3, the wood chipper 10A comprises a cutting assembly 30 further comprising cutters, chippers, or other reducing system (not shown) disposed within the housing 34. For example, cutting assembly 30 may include a rotating cutting head, disk, or drum which effectuates cutting, chipping, or otherwise reducing the bulk wood material. In one exemplary configuration, the cutting assembly 30 is axially mounted on a shaft (not shown) which is operatively connected to the power source 18A for rotation thereby. Power source 18 may comprise any known power source, for example, and IC engine (18A as depicted in FIG. 3), or an electrical drive (18B as depicted in FIG. 4). Of course, the IC engine 18A may comprise any known engine. By way of another exemplary embodiment, FIG. 4 depicts a wood chipper 10B comprising a cutting assembly 30 further comprising cutters, chippers, or other reducing systems 32. Cutters 32, for example, may include a rotating cutting assembly comprising a disk or drum to effectuate cutting, chipping, or otherwise reducing the bulk wood material. In this particular configuration, the cutters 32 comprise a disk cutting head axially mounted on a shaft 36, wherein shaft 36 is operatively connected to the power source 18 for rotation thereby. Power source 18 may comprise any known power source, for example, and IC engine (18A as depicted in FIG. 3), or an electrical drive (18B as depicted in FIG. 4). Of course, the electrical drive 18B may be powered in any known manner including powered via an IC engine or a source of electricity, whether from a readily available source (e.g., a power grid), or from a portable source such as a generator or batteries. In the exemplary configuration, rotatable shaft 36 is operatively connected to the cutters 32 and one or more pulleys 38 are also disposed on shaft 36. The chipper 10B also includes a rotatable shaft 19A operatively connected to the drive 18B and one or more pulleys 19B disposed about the shaft 19A. The chipper 10B further includes a belt or belts 19C operatively disposed over and interconnecting pulleys 19B and 38, whereby the drive 18B rotates the cutters 32. Of course, other configurations, systems, and linking methods may be utilized to operatively connect power source 18 to cutters 32 for operation.

Also depicted in FIGS. 3A, 3B, 3 and 4 is an accumulator 50 adapted to receive, store, and release a charge, for example an internal charge, wherein accumulator 50 is operatively connected to the cutting assembly 30, and as illustrated by FIG. 4 operatively connected to cutters 32 so as to power the cutting system 30 (e.g., cutters 32) upon discharge of the stored charge in accumulator 50. In the exemplary embodiment, accumulator 50 comprises a receptacle 52 adapted to receive, store, and release a charge, and further comprises an inlet 54 for receiving a first charge (C1) from a charging device 70, and an outlet 56 for discharging a second charge (C2) to a motor 80. For example, accumulator 50 may be a battery for receiving, storing, and releasing an electrical charge to the motor 80, or a pressurized tank for receiving, storing, and releasing a pressurized charge to the motor 80.

Figure 5:
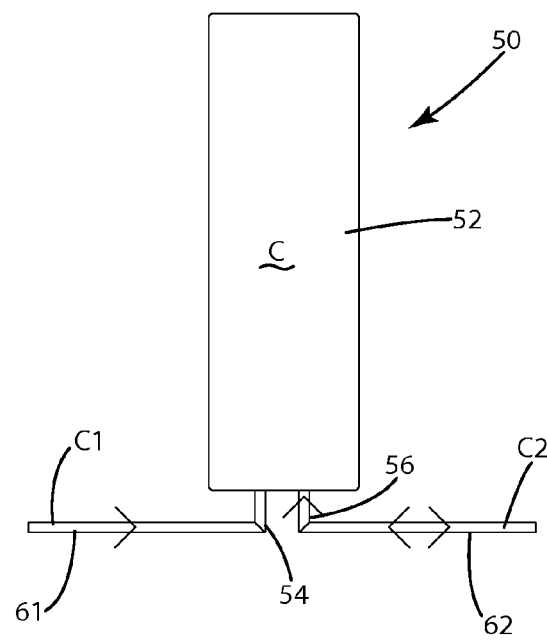
FIG. 5 is a partial view of one embodiment of an accumulator of the present invention.
Figure 6:
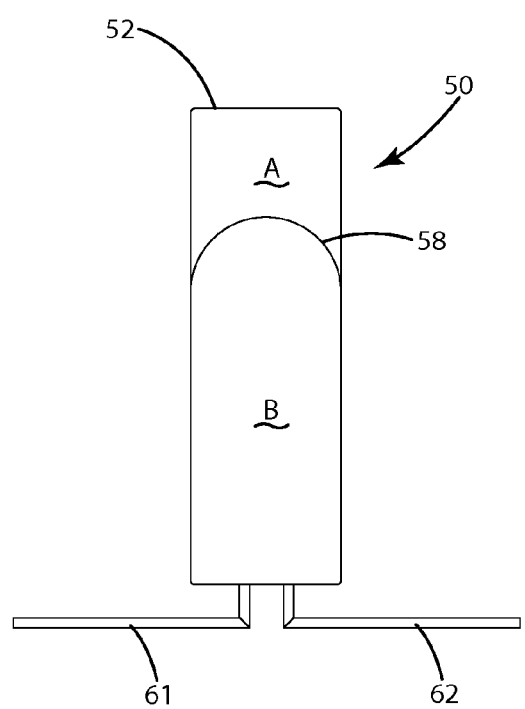
FIG. 6 is a sectional view of the accumulator of FIG. 5.

FIGS. 5 and 6 illustrate one exemplary embodiment of accumulator 50 comprising a tank 52 which is adapted to receive, store, and release a pressurized charge (C) and further comprises an inlet 54 for receiving a first pressurized charge (C1) from charging device 70 (via lines 61), and an outlet 56 for discharging a second pressurized charge (C2) to motor 80 (via lines 62). In the embodiment depicted in FIG. 6, tank 52 comprises a first chamber A sealed (e.g., fluidly separated) from a second chamber B by a bladder 58. In this exemplary configuration then, hydraulic fluid pumped or charged by charging device 70 (e.g., a pump) is pumped into and enters chamber B, via line 61 and inlet 54, and pressurizes tank 52 by increasing pressure in chamber B, thereby causing bladder 58 to move and thereby increase pressure in chamber A which is filled with an inert gas and for example only, nitrogen. Accumulator 50 can then store this pressurized charge (C) for use by motor 80 (e.g., a hydraulic motor), whereby the now pressurized hydraulic fluid can be discharged from chamber B, via outlet 56 and line 62, to drive and power motor 80, when desired, and thereby drive or assist with the operation of the cutting assembly 30.

Figure 4A:
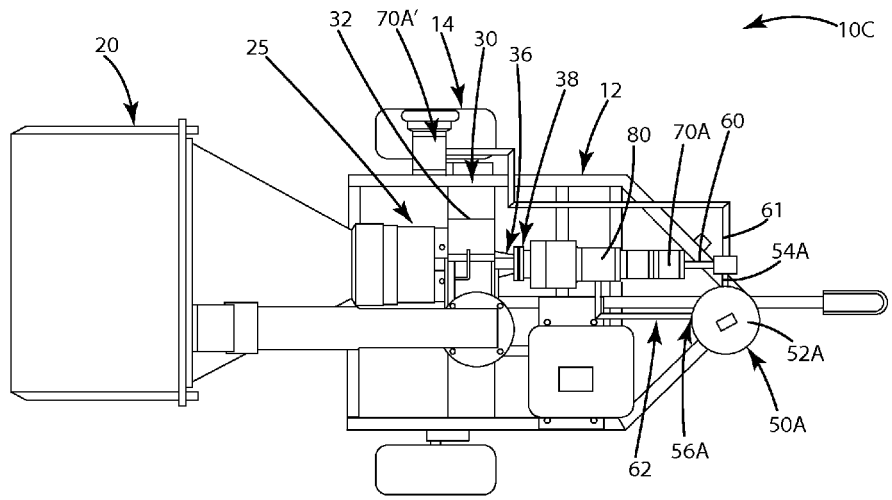
FIG. 4A is a top view of yet another embodiment of a waste processing machine of the present invention.

Of course, accumulator 50 may comprise any known device for storing energy. FIG. 4A depicts yet another embodiment which includes a battery 52A which is adapted to receive, store, and release an electrical charge and further comprises an inlet 54A for receiving a first electrical charge from charging device 70A, and an outlet 56A for discharging a second electrical charge to electrical motor 80A. In this configuration then, electrical charge enters battery 52A via inlet 54A and is discharged via outlet 56A.

Figure 4B:
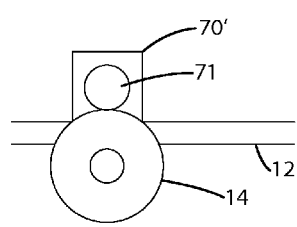
FIGS. 4B-4C are diagrammatic representations of one system configuration of a charging devices according to one embodiment of the present invention.

As described herein, charging device 70 may comprise any known device for creating, charging, or otherwise supplying energy or a charge to accumulator 50. As depicted in FIG. 4, charging device 70 may be a mechanical or hydraulic pump which is adapted to produce a first charge C1 and output the first charge to the accumulator 50, wherein pump 70 is operatively (e.g., fluidly) connected to accumulator 50 for reception and storage of the fluid charge. As depicted in FIG. 4A, charging device 70A may be an electrical generator which is adapted to produce a first charge C1 and output the first charge to the accumulator 50, wherein pump 70A is operatively (e.g., electrically) connected to accumulator 50 for reception and storage of the electric charge. Further, in the embodiment illustrated by FIG. 4, a pair of hydraulic pumps 70 and 70' are each fluidly connected to fluid accumulator 50 and adapted to generate a pressurized charge which is delivered to accumulator 50 via inlet 54. For example, a pump 70 may be operatively connected to shaft 36, thereby converting rotational energy of shaft 36 into a pressurized fluid (charge), thereby generating a pressurized charge in response to shaft 36 being turned. As such, the inventive system makes it possible to utilize and convert the rotational energy of the moving shaft 36 and cutting head 32 into a pressurized charge which can be stored in the accumulator. For example, during periods when the cutting head is not used, as when the machine 10 is running but not actively reducing wood products, or for regenerative braking of the shaft 36 and head 32, whereby this braking energy can be converted into a charge stored in the accumulator. Additionally, more than one charging device 70 may be used and connected to other systems (S) that are adapted to or capable of operating charging device 70. Systems S may include for example, power source 18, cutting system 30, feed system 25, and wheels 14. For example, FIG. 4 depicts a (second) pump 70' which may be operatively connected to the wheels 14 and thereby adapted to generate a charge when the wheels 14 are turned (e.g., when system 10 is transported). FIG. 4B illustrates one such embodiment wherein the pump 70' comprises an operable connection 71 which is operatively connected to one or more systems S for producing a charge thereby. In this example, pump 70' includes an operable connection which comprises a wheel 71 that may be rotatingly connected or otherwise engaged with wheel 14 of the trailer. In this manner, during transportation of the trailer, some rotational energy of the wheels 14 can be used to charge the accumulator.

In another exemplary embodiment (FIG. 4A), a pair of electrical generators 70A and 70A' are each electrically connected to accumulator 50A and adapted to generate an electrical charge which is delivered to accumulator 50A via inlet 54A. For example, an electrical generator 70A may be operatively connected to shaft 36, thereby converting rotational energy into electrical energy, thereby generating an electrical charge in response to shaft 36 being turned. Alternatively, or in addition thereto, a generator 70A' may be operatively connected to the wheels 14, thereby generating a charge when the wheels 14 are turned (e.g., when system 10 is transported).

As such, charging device 70 is thereby operatively connected to one or more systems S of the wood chipper 10 which are adapted to operate the charging device 70 (e.g., rotational components) and thereby produce a charge in response to the operable connection. In this manner the charging device 70 produces a charge via its operable connection to the one or more systems of the chipper 10; this charge is then sent to and received by the accumulator 50 via inlet 54; whereby the accumulator then powers the cutting system 30 through the discharge of the accumulated charge, via outlet 56, and for example via motor 80.

Motor 80 is adapted to operate cutting system 30 in response to the output charge of accumulator 50. For example, motor 80 may be an electrical motor electrically connected to an electrical accumulator 50 (e.g., a battery) and operatively connected to power cutting system 30; or may be a mechanical motor fluidly connected to a pressurized accumulator 50 (e.g., a tank) and operatively connected to power cutting system 30.

In one exemplary embodiment, motor 80 may be operatively connected to shaft 36, thereby rotating shaft 36 and powering cutting system 30. For example, motor 80 may comprise a hydraulic motor, operatively mounted to shaft 36, which is fluidly connected to outlet 56 of accumulator 50. In this manner when accumulator 50 discharges the pressurized charge via outlet 56, motor 80 converts the pressurized charged into rotational energy and thereby rotates shaft 36 and correspondingly, at least partially, rotates cutters 32. In another exemplary embodiment, motor 80 may comprise an electric motor, operatively mounted to shaft 36, which is electrically connected to outlet 56 of accumulator 50. In this manner when accumulator 50 discharges the electrical charge via outlet 56, motor 80 converts the electrical charged into rotational energy and thereby rotates shaft 36 and correspondingly rotates cutters 32, thereby at least partially powering cutters 32.

Figure 7:
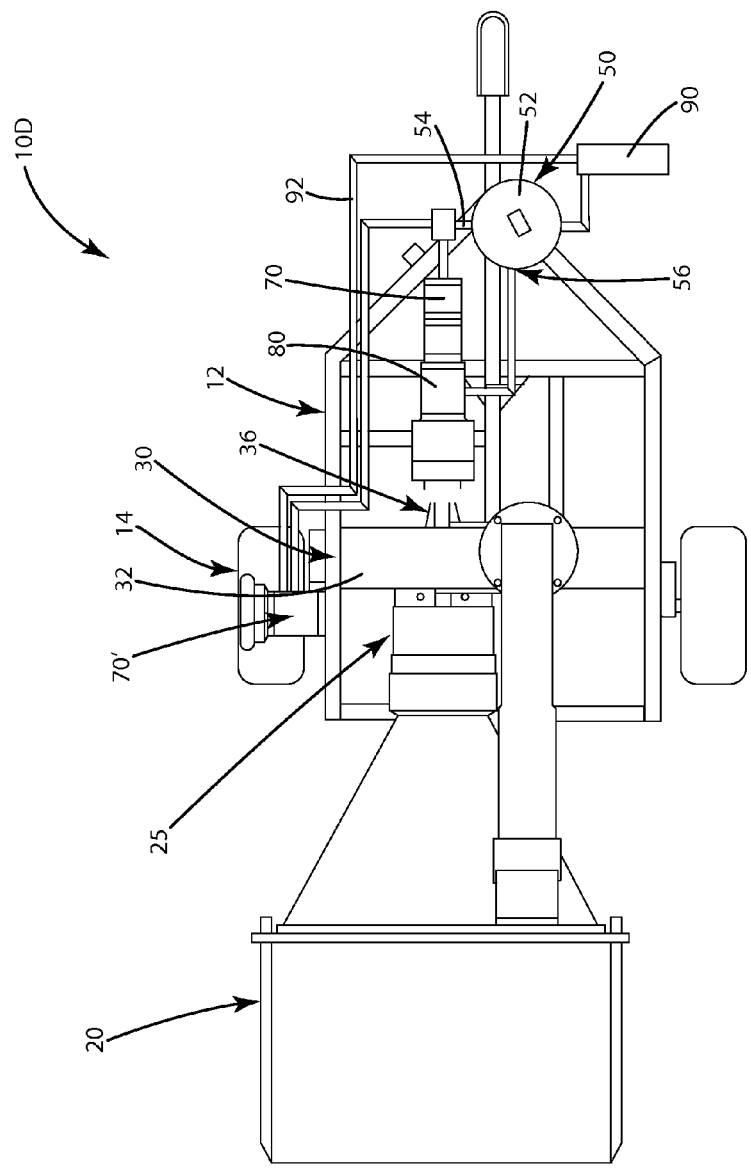
FIG. 7 is a top view of another embodiment of the waste processing machine of the present invention.

FIG. 7 depicts yet another embodiment 10D of a wood chipper 10 similar in configuration to the previously described embodiments, wherein the accumulator 50 is the primary and sole power source. In one exemplary embodiment, rotatable shaft 36 is operatively connected to the accumulator through the motor 80. This embodiment may also comprise a controller 90, as described herein-below.

For example, charging device 70, which is adapted to produce a first charge and output the first charge to the accumulator 50 may be an electrical generator for generating a first electrical charge, wherein generator 70 is operatively connected to accumulator 50 for reception and storage of the charge. Alternatively device 70 may be a mechanical pump for generating a first pressurized charge, wherein pump 70 is operatively (e.g., fluidly) connected to accumulator 50 for reception and storage of the charge. Wherein further, the motor 80 is adapted to operate cutting system 30 in response to the output charge of accumulator 50. For example, motor 80 may be an electrical motor electrically connected to accumulator 50 and operatively connected to power cutting system 30, or may be a mechanical motor (e.g., pump) fluidly connected to accumulator 50 and operatively connected to power cutting system 30.

As such, charging device 70 is operatively connected to one or more systems of the wood chipper 10 which are adapted to operate the charging device (e.g., rotational components) 70 and thereby produce a charge in response to the operable connection. In this manner the charging device 70 produces a charge via its operable connection to the one or more systems of the chipper 10D, this charge is then sent to and received by the accumulator 50 via inlet 54, whereby the accumulator then exclusively powers the cutting system 30 through the discharge of the accumulated charge via outlet 56, for example, via motor 80.

Figure 4C:
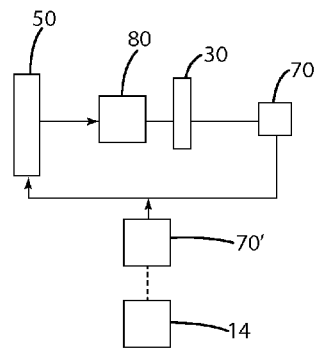
Figure 8:
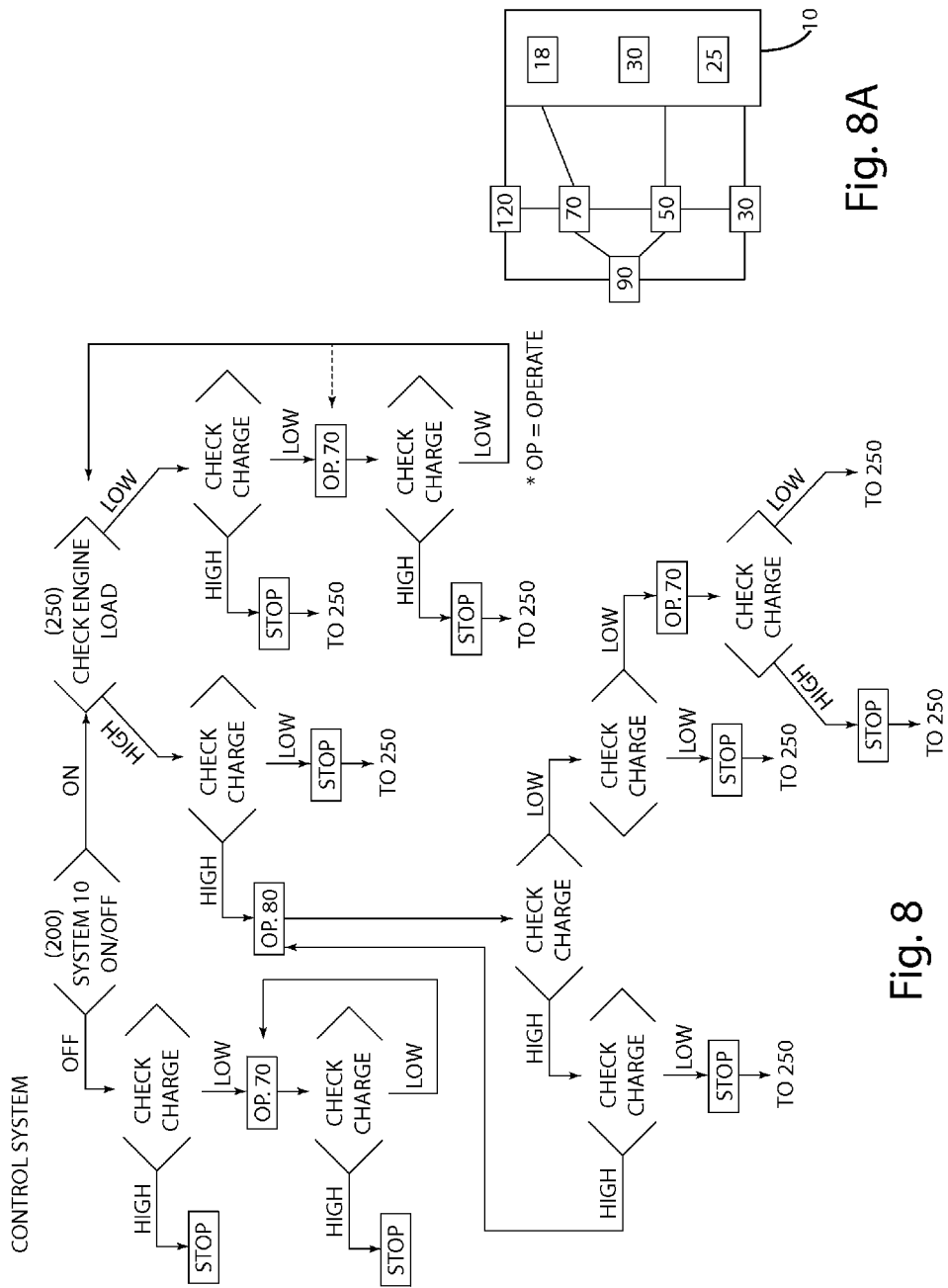
FIG. 8 is a flow chart of one embodiment of a control system of the present invention.

In one exemplary embodiment as depicted in FIG. 4C, accumulator 50, charging device 70, and motor 80 are adapted for hydraulic operation. As such, accumulator 50 comprises a tank 52 which receives, stores, and discharges hydraulic fluid through hydraulic lines 60, 61, and 62. Operation is such that when accumulator 50 requires a charge (as determined by control system 90, or manually by the operator) one or more hydraulic pumps 70 and/or 70' are activated, creating a pressurized flow of hydraulic fluid in corresponding lines 60 and 61. Tank 52 then receives this charge of pressurized fluid via inlet 54 and stores the charge in tank 52. When demand is such that it is desirable to utilize the stored charge (as determined by control system 90, or manually by the operator), hydraulic motor 80 is activated by releasing or discharging the stored pressurized fluid, via outlet 56 and into line 62, thereby powering motor 80 and correspondingly cutter 32. While charging devices 70 may be automatically controlled and operated via control system 90, it is also envisioned that they may be controlled or operated manually by the operator, if desired. Correspondingly, one or more motor(s) 80 may also be automatically controlled and operated via control system 90, while it is also envisioned that they may be controlled or operated manually by the operator, if desired. An exemplary flow chart for control system 90 is depicted in FIG. 8.

In general operation then, reducing system 10 is transported to the desired site utilizing the trailorable frame 12 and hitch 16. Once on-site the system 10 is started and allowed to initialize or ramp-up to normal operational parameters. As described herein, during this initial start-up system 10, and in one particular example cutter 32, requires a larger supply of power during this initialization or ramp-up phase than it does once initialized and in order to maintain normal operation. Wood products are then fed into system 10, via infeed assembly 20 and feed system 25, to cutting assembly 30 where reduction (e.g., chipping, shredding, and cutting) takes place. The reduced material is then discharged through discharge system 40.

During operation it is normal to have periods of time when the feeding and reducing operation is either not used or halted, yet the system 10 remains powered. This can occur for example when wood is being gathered or readied for feeding, wherein the cutting assembly 30 is maintained in a rotationally operative state. During these periods of time of inactivity, and in part because the waste processing system 10 required time and energy to ramp-up, it is not practical to turn the cutting assembly 30 off during these interim periods of time. therefore, during these inactivity periods the machine remains powered and the cutting assembly remains operationally connected to and powered by power source 18. This is sometimes called the idle-process. However, it is worth noting that system 10 can have multiple idle speeds dependent upon desired operational characteristics.

Additionally, during the feeding and reducing operation it is normal to have periods of time wherein the cutter 32 is fully loaded, and at times may be over-loaded. The ability of system 10 to handle these high demand times and operational capacity are typically determined by the size of system 10 and the corresponding size of power source 18. Therefore a larger power source 18 is generally used in order to overcome these high demand periods, even though these high demand periods comprise, generally speaking, only a small period of time of operational capacity of the system. As such, the larger source 18 will consume more energy (as compared to a smaller power source) during all times of operation, including those times when a lager power source is not required. Hence, energy is not conserved.

Yet further, and for example when an electric drive is used, when the system 10 is initially powered the drive requires a higher power (amperage) than is required to sustain the drive. As such, the drive must be sized so as to allow for this high, albeit brief, higher amperage requirement so as to not blow or trip circuit breakers. Therefore a larger drive 18 is again utilized in order to overcome this high demand period and again, this larger source 18 will consume more energy.

As a solution and as described herein above, accumulator 50 is adapted to be charged during these idle and off-peak times, and is adapted to be discharged during periods of high demand. In this manner a charge is stored in accumulator 50 during periods of low demand which may be used during periods of high demand. For example, the accumulator may be charged when the system is being transported, readying the accumulator 50 to assist with the initial start-up sequence. Further, the accumulator may be charged when the system is in a low demand or idle state thereby readying the accumulator 50 to assist during periods of high demand; whereby the accumulator may be discharged to assist the system when the system is in a high demand state such as when initializing the system or when under a heavy load such as when large diameter logs are actively being reduced.

Consequently, the power source 18 need not be sized for these high demand applications and periods, and rather can now be sized so as to take into account the assistance of the charge in accumulator 50. This then allows for the power source to be reduced in size and capacity, yet still allows for the high demand times and operations to be handled, via the assistance of the accumulator 50. The result of this is a novel waste process system and methods 10 which utilize a smaller power source 18, yet comprise the same operational capacity or load of a system having a larger power source.

For example, the invention may be configured to utilize an Internal Combustion (IC) engine that is rated below 50 Horse Power (HP), while having the operational capacity of a reducing system that utilizes an engine larger than 50 HP. In this manner not only can operational savings be achieved, but also by utilizing smaller engines, savings can also be achieved via reduced permits, licensing, and other regulatory fees and taxes. In likewise fashion, the invention may be configured to utilize an electrical engine or drive that is rated below 150 Amps, while having the operational capacity of a reducing system that utilizes a drive larger than 150 Amps resulting again in lower costs and expenses.

Additionally, while accumulator 50 may be operatively connected to system 10 for use in conjunction with and assisting power source 18, accumulator 50 may also be operatively connected to system 10 and utilized exclusively to power system 10 and cutting assembly 30. For example, in one embodiment as illustrated by FIG. 7, accumulator 50 is the sole and exclusive power source 18. In another embodiment, accumulator 50 is utilized to exclusively start-up the cutting assembly 30, while power source 18 is utilized to power the various other systems of system 10. In yet another embodiment, accumulator 50 is utilized exclusively during periods of high demand on cutting assembly 30, while power source 18 is utilized to power the various other components of system 10. In yet another embodiment, accumulator 50 is utilized in conjunction with power source 18 during periods of high demand on cutting assembly 30. Again, these operational configurations may be manually operable or controlled by control system 90.

It is also notable that the operation of accumulator 50, charging device 70, and motor 80 is accomplished without the noise, vibration, and discharge emissions associated with regular power sources 18 (e.g., IC engines). As such, and while the noise of cutter 32 during chipping/reducing operations remains the same, operation of system 10 during start-up, idle, and low periods of demand is significantly quieter, as well as more environmentally friendly.

A control system 90 is adapted to control the operation (e.g., turn on, off, cycle) of one or more of the charging device 70, the motor 80, and the reception, storage, and discharge of the accumulator 50 in response to desired characteristics or parameters, whether measured, sensed, or predetermined. For example, in response to: one or more of the charge stored in the accumulator; the operational load on one or more components of system 10 (for example power source 18); the speed of one or more components of system 10 (for example power system 18); or the transportation of system 10. Other responsive configurations include: in response to the system 10 being in an unloaded, idle, or stand-by state; and when the cutting system is not being used for reduction. For example, when the cutter 32 is not being used to reduce material, control system 90 may operate charging devices 70 in order to accumulate a charge in accumulator 50 to be used at a later time, thereby recovering, at least partially, energy that would be otherwise lost. Control system 90 may also be configured to replace manual operation of devices 50, 70, and 80, or configured to be used therewith. An exemplary flow chart for such a control system 90 is depicted in FIG. 8, while further operational characteristics (whether automatic or manual) are described herein-below.

Normal operation of a wood chipper typically requires that its power source operate at a certain level in order to operatively power the various systems of the wood chipper 10. For example, for a wood chipper 10 powered by an IC engine 18, in order to properly power the feed system 25 and the cutting system 30 of a wood chipper 10 during chipping, the engine 18 should be powered or operated at a predetermined and/or threshold Revolutions-Per-Minute (RPM). This predetermined level is typically arrived at by determining, under normal operating conditions, the RPM level that the engine 18 requires in order to sustain the feed system 25 and the cutting system 30 at an acceptable level while the wood chipper 10 is in operation and chipping. As such, when the chipper 10 is operated below this first predetermined level, the chipping or reducing of the bulk wood products should not normally be performed. However, there are times when the chipping operation is not required and at these times it is not always prudent to maintain the engine 18 at the desired first predetermined level. For example only, when the operator is gathering, securing, or otherwise getting ready the unprocessed wood products, it is not always desirable to operate the engine 18 at the first predetermined level. During this period it may be desirable to operate the engine at, for example, a lower engine speed thereby reducing the wear on the engine, as well as reducing fuel consumption (a second predetermined level). For example only and in the illustrated embodiment, this first predetermined, threshold, or desired RPM has been determined to be 2500 RPM of the engine 18, at or above which the chipping operation (i.e., operation of the feed system 25 and the cutting system 30 while feeding bulk wood products to the chipper 10) is acceptable, but below which the chipping operation is not optimally performed or is restricted. However, other systems of chipper 10 can be operated below this first threshold, at a reduced or second predetermined level. Again for example only, this may be 1500 RPM.

U.S. Pat. Nos. 6,830,204, 6,814,320 to Morey et al., entitled Reversing Automatic Feed Wheel Assembly for Wood Chipper are incorporated herein by reference in their entirety, and offer further descriptive and exemplary details. As such for example, accumulator 50 may be discharged when the chipper 10 is determined to be at or below the first predetermined level and while the reducing operation is required, thereby assisting the power source 18 with the load during these high demand times. Further, in this embodiment the assistance provided by the accumulator 50 will act to delay and may prevent the reversing automatic feed wheel assembly (described in U.S. Pat. Nos. 6,830,204, 6,814,320) from actuating due to the assistance of the accumulator. Correspondingly, the accumulator 50 may be charged when the chipper is determined to be within a range of the second predetermined level. Again, this operational configuration can be done manually, or automatically via control system 90. With this being understood: henceforth we will limit our discussion to control system 90 with the understanding that the system could also be configured to be used exclusively or in conjunction with a manual system.

Yet further, it is not desirable to allow operation of the charging device 70 during periods of high demand of system 10, as this would act to increase the already loaded system. As such, control system 90 may be configured to operate the charging device 70 only during certain predefined periods and predetermined operational manners, including periods of low demand. For example, when the engine 18 is set to operate (or operates) at (or below) the first or second predetermined level. However, when the engine is set to operate (or operates) at (or above) the first predetermined level, the motor 80 may be employed to assist with operational capacity. By way of further example, a predetermined operational manner of system 10 may comprise turning on devices 70 (i.e., charging) when the engine is at (or below) the second predetermined level, and turning on motor 80 (i.e., discharging) when the engine is at (or above) the second predetermined level. Of course, any operational configuration may be so configured.

In yet another embodiment depicted in FIG. 8A, control system 90 may comprise one or more sensors 102 which are operatively connected to one or more of the power source 18, feed system 25, and cutting assembly 30. Sensors 102 are adapted to read, determine, or sense the load on the one or more systems 18, 25, and 30. For example, in one embodiment, sensors 102 are adapted to determine the load on system 10 via the engine speed of engine 18, thereby sending a signal to controller 90, wherein controller 90 in response thereto determines the proper operation of the accumulator 50, charging devices 70, and motors 80.

The control system 90 may also be operatively connected to the feed system 25 and cutting assembly 30 for operation thereby as described herein-above. Further, the control system 90 may be operatively connected to feed system 25 in order to stop, start, and/or reverse the one or more feed wheels 26 according to particular desired operational configurations. It should also be appreciated that the control system 90 may be used with mechanical, electrical, and hydraulic systems.

As such, the control system 90 may be adapted to operate or regulate the charge, storage, and discharge of the accumulator 50. This may be accomplished for example by one or more of: turning on and off the charging device 70; turning on and off the motor 80; and/or regulating one or more of the reception, storage, and discharge of the accumulator, in response to a charge stored in the accumulator. As described above, this charge may comprise any form of potential energy including, but not limited to, an electrical or pressurized charge. Yet further, this may be accomplished for example by one or more of: turning on and off the charging device 70; turning on and off the motor 80; and/or regulating one or more of the reception, storage, and discharge of the accumulator, in response to a load condition of one or more of the measurable operating systems of wood chipper 10. This load may be determined by measuring certain operational characteristics, for example the rotational components of system 10 including but not limited to engine Revolutions-Per-Minute (RPM) and cutter RPM, as well as non-rotational rotational components including but not limited to hydraulic pressure, as well as any other manner capable of measuring the load or demand on the system 10.

The operation and load conditions may comprise, for example: when the load on the chipper is above a predetermined threshold, releasing the charge stored in the accumulator 50 to the motor 80. This may be accomplished in conjunction with the power source 18 for operational assistance, or exclusively in replacement thereto; when the load on the chipper is below a predetermined threshold, activating the charging device 70 to charge the accumulator 50; while the cutter 32 is rotating, and the charge stored in the accumulator 50 is below a predetermined threshold, activating the charging device 70, operatively attached to the cutter 32, to charge the accumulator 50; and while the cutter 32 is rotating, and the charge stored in the accumulator 50 is below a predetermined threshold, activating the charging device 70, operatively attached to the cutter 32, to charge the accumulator 50 and assist with stopping/braking the cutter 32; further, when the chipper 10 is transported and the charge stored in the accumulator 50 is below a predetermined threshold, activating the charging device 70, operatively attached to the wheels of the chipper 10, to charge the accumulator 50 while moving or braking.

Figure 9:
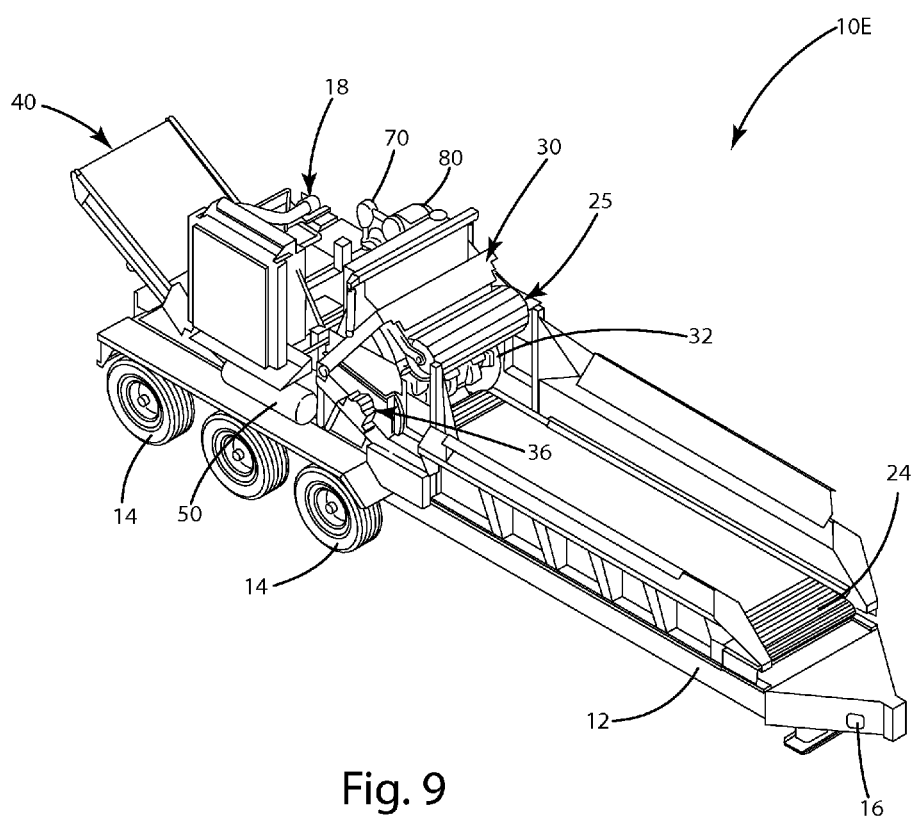
FIG. 9 is a perspective view of another embodiment of the waste processing machine of the present invention.

FIG. 9 depicts yet another embodiment comprising a waste processing machine 10E similar in configuration to the previously described embodiments, wherein the accumulator 50, charging device 70, one or more motors 80, and, if desired, a control system 90 (not shown) has been adapted for use on the waste processing machine 10E driven by an IC engine 18.

As illustrated, a secondary power source for a rotatable cutting head 32 of a waste processing system 10E is disclosed, wherein the rotatable cutting head 32 is mounted axially on a shaft 36, whereby the shaft is operatively connected to a primary power source 18 for rotating the cutting head 32. The secondary power source comprises an accumulator 50 adapted to be operatively connected to the shaft 36, via a motor 80, the accumulator 50 being adapted to rotate the shaft 36 thereby at least partially powering the cutting system 30, whereby the accumulator 50 is adapted to receive, store, and release a charge. Also included in this embodiment is a charging device 70 which is adapted to be operatively connected to the accumulator 50 for charging the accumulator, wherein the charging device 70 is adapted to be operatively connected to one or more components of the system 10E, for example one or more rotational components, including but not limited to the power source 18, the feed system 25, the cutting system 30, the wheels 14, and is adapted to produce a charge in response to the one or more components 14, 18, 25 and 30 of the system 10E being operated, whereby the charging device 70 is adapted to charge the accumulator 50, and the accumulator is adapted to power one or more rotational components of system 10E, including but not limited to the power source 18, the feed system 25, and the cutting system 30 through the discharge of an accumulated charge. For example, the accumulator 50 may be operatively connected to a rotatable cutting head 32, via motor 80, for rotation thereby.

Also disclosed is a method of powering a waste processing machine 10 which comprises: in a waste processing system 10 comprising a trailorable frame 16 including wheels 14, a power source 18, a cutting system 30, and a feed wheel system 25; providing a motor 80 adapted to be operatively connected to one or more of the power source 18, the feed system 25, and the cutting system 30; providing an accumulator 50 adapted to be operatively connected to the motor 80, the accumulator 50 adapted to receive, store, and release a charge; providing a charging device 70 adapted to be operatively connected to the accumulator 50 for charging the accumulator 50; producing the charge with the charging device 70 through one or more of the power source 18, the feed system 25, the cutting system 30, and the wheels 14; receiving and storing the charge in the accumulator 50; releasing the charge stored in the accumulator 50 to the motor 80; and operating one or more components of the waste processing system 10 including but not limited to the power source 18, the feed system 25, and the cutting system 30, with the motor 80 utilizing the charge.

The specific configurations and features of accumulator 50 may vary according to specific requirements. In one preferred embodiment, a tank 52 comprises a first (in this particular case, an upper) chamber A which is sealed and separated (e.g., fluidly) from a second (in this particular case, a lower) chamber B by a bladder 58, wherein chamber A is filled with an inert gas, for example nitrogen. This configuration allows the pressurized fluid entering chamber B to compress the gas in chamber A, by exerting pressure against bladder 58, thereby allowing a charge or pressure to be stored within tank 52. Of course, other configurations of accumulator 50 and tank 52 may be used, and this is exemplary and not limiting. Further, multiple accumulators may be utilized to increase the amount of stored energy which is available.

Figure 10:
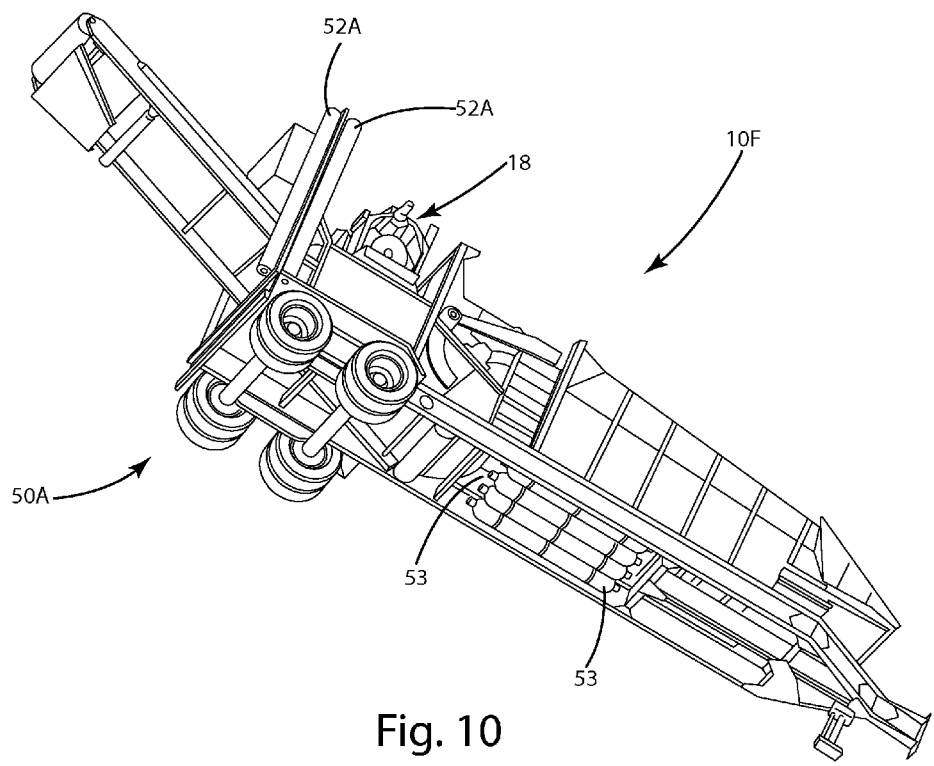
FIG. 10 is a bottom perspective view of another embodiment of the waste processing machine of the present invention.
Figure 10A:
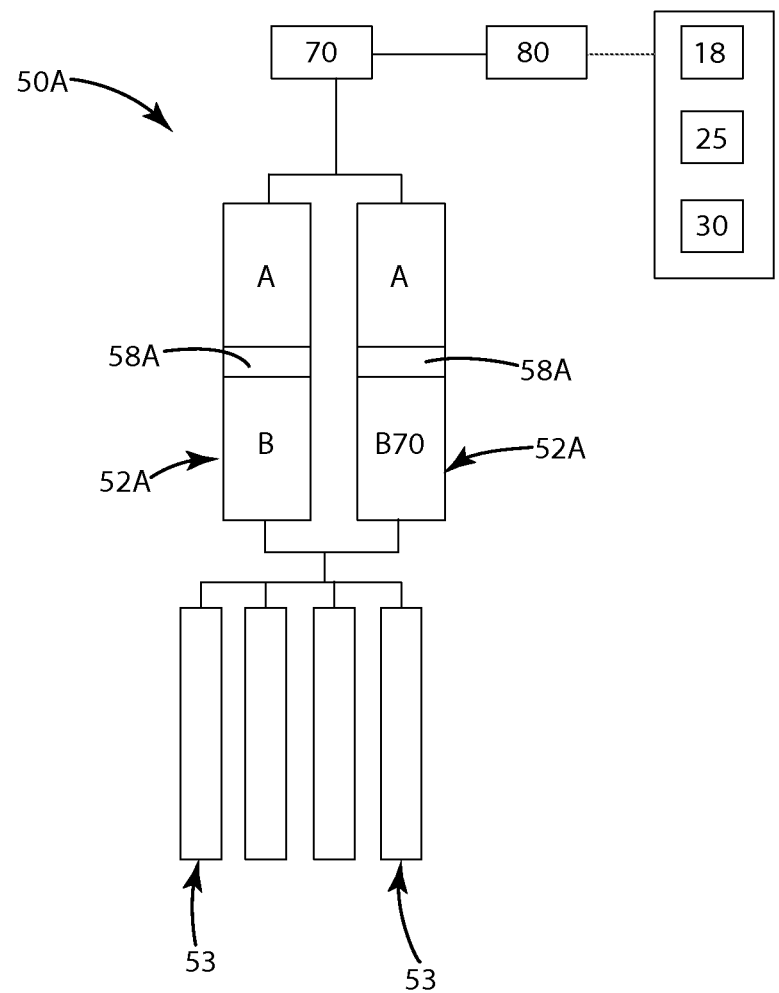
FIG. 10A is a diagrammatic representations of one system configuration of an accumulator system according to one embodiment of the present invention.

FIG. 10 illustrates yet another embodiment of a waste processing system 10F which utilizes an electric drive for its power source 18, and further includes a secondary rechargeable power source comprising an accumulator system 50A comprising one or more, and in this case a pair, of first tanks 52A operably connected to one or more, and in this case two pair, of second tanks 53. As illustrated in FIG. 10A, tanks 52A are piston accumulators comprising a first portion A and a second portion B separated by a movable piston 58A, wherein first portion A is fluidly connected to charging device 70, and second portion B is fluidly connected to tanks 53. Tanks 53 are single chamber storage tanks. In exemplary use then, and when charging, hydraulic fluid (e.g., oil) is pumped via hydraulic pump 70 into first portion A of tanks 52A, which results in moving pistons 53, thereby increasing pressure in second portion B and accordingly, pressure increases in tanks 53 which are connected thereto. The process is reversed for discharging, wherein the hydraulic fluid is moved out of portion A of tank 52A by the pressure in portion B and tanks 53, and moved to motor 80, which is operably coupled to one or more primary system of the processing machine, for operation and assistance thereby. For example for assisting with the operation of the cutting drum 32.

For example: during the charging process, and starting with nitrogen stored in tanks 53 at an approximate steady-state pressure of 1500 Pounds/Square Inch (PSI); as the pump 70 pumps oil into tanks 52A (the oil side), the pistons 58A move and act to increase the pressure on the nitrogen side (e.g., portion B and tanks 53); as the piston moves toward the nitrogen side the pressure increases until we reach the desired PSI, which in this case is 3000 PSI. Once filled, there is a large amount of potential energy, stored in the nitrogen side, that can be used to effectuate, power, and assist one or more of the primary systems 18, 25 and 30 and in this example, to assist with operation of the cutter 32 when desired. When additional power is desired, for example during start-up or high load applications, the accumulator system 50A can be discharged whereby the pressurized nitrogen is allowed to flow and effectuate movement of piston 53; as the pistons move towards the oil side the oil is moved to, through, and operates a hydraulic motor 80; whereby the motor 80 is operably attached to the cutter 32 and thereby assists in powering cutter 32, thereby decreasing the power required to be supplied by the drive 18; the pressure on the nitrogen side will accordingly decrease until either the process is stopped or until the pressure reaches the predetermined steady state of approximately 1500 PSI. Further, while this operation may be carried out manually, it is envisioned that the various systems and procedures involved with charging and discharging the accumulator system 50A may be controlled by a controller 90.

Figure 10B:
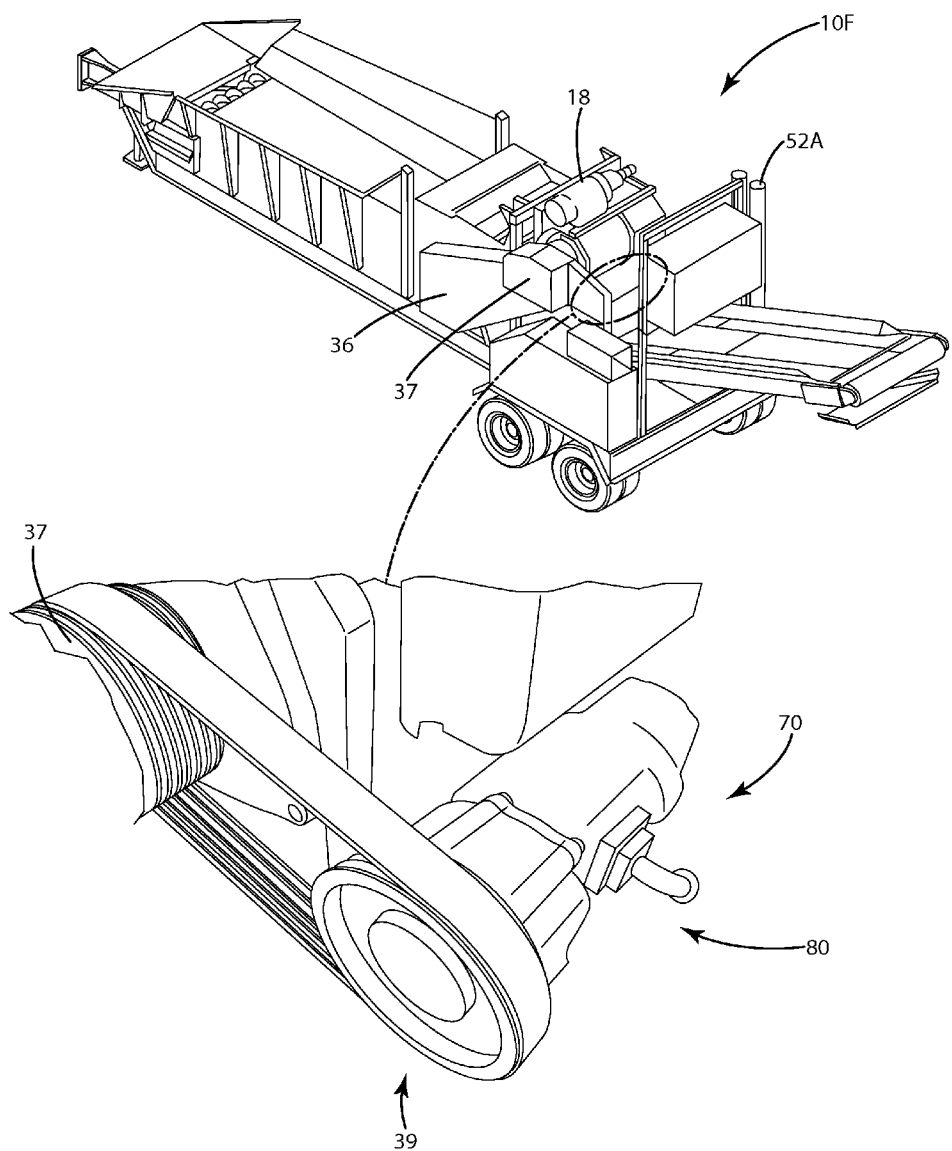
FIG. 10B is a top perspective view of the waste processing machine of FIG. 10.

As illustrated in FIG. 10B, in one embodiment pump 70 and motor 80 are connected to a clutch 39, which is operably connected to shaft 37 of drive 18 (e.g., via a pulley system and belts), which in turn is operably connected to shaft 36 of cutter 32 (e.g., via a pulley system and belts). In this manner pump 70 and motor 80 are operably connected to cutter 32.

Waste processing system 10 accomplishes many of its operations as described herein simultaneously and as such, the system does not necessarily have a linear sequence of events. therefore, the system has been described by reference to the various operations and the actions performed therein. However, it is to be understood that various modifications may be made to the system 10, it sequences, methods, orientations, operations, and the like without departing from the inventive concept and that the description contained herein is merely a preferred embodiment and hence, not meant to be limiting unless stated otherwise.

Advantageously, the waste processing system of the present invention yields a waste processing machine with the ability to utilize, harness, capture, and recycle energy during periods of reduced load, as well as the ability to provide additional power during periods of higher demand loads.

The solutions offered by the invention disclosed herein have thus been attained in an economical, practical, and facile manner. To wit, a novel waste processing machine which increases utility, efficiency, reliability, and sustainability, while decreasing reliance on standard petroleum based fuels. While preferred embodiments and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to appreciated that various changes, rearrangements, and modifications may be made therein, without departing from the scope of the invention as defined by the claims.

The invention claimed is:

1. A waste processing system for reducing wood material comprising:
   a frame comprising at least one pair of wheels;
   a primary power source operatively supported by the frame and operatively connected to at least one of a cutting system and a feed system;
   an infeed assembly for receiving waste material to be reduced;
   a rotatable cutting assembly operatively supported by the frame and spaced from the infeed assembly, the cutting assembly comprising a cutting head axially mounted on a shaft, the shaft operatively connected to the primary power source for rotation thereof;
   a feed system disposed between the infeed assembly and the cutting assembly to feed material to the cutting assembly;

a secondary power source operatively connected to the shaft, the secondary power source adapted to at least partially rotate the shaft;

the secondary power source comprising at least one tank for receiving, storing, and releasing a pressurized charge;

the tank comprising a first and a second chamber separated by a movable member, wherein one of the first and the second chamber is adapted to receive a hydraulic fluid and the other of the second and first chamber is adapted to retain a pressurized gas;

a pump hydraulically connected to the secondary power source and adapted to pump hydraulic fluid to the secondary power source, the pump operatively connected to the waste processing machine for operation thereby;

a control system adapted to control operation of the pump and the pressurized charge of the secondary power source;

whereby the pump charges the secondary power source and the secondary power source at least partially drives the cutting system through the shaft, via the pressurized charge, and as controlled by the control system.

* * * * *